United States Patent
Ruan et al.

(10) Patent No.: US 8,238,126 B2
(45) Date of Patent: Aug. 7, 2012

(54) CURRENT REGULATOR

(75) Inventors: Fai-Ruei Ruan, Taipei (TW); Nung-Te Huang, Taipei (TW); Chih-Wan Hsu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 411 days.

(21) Appl. No.: 12/641,287

(22) Filed: Dec. 17, 2009

(65) Prior Publication Data

US 2010/0164452 A1    Jul. 1, 2010

(30) Foreign Application Priority Data

Dec. 31, 2008   (TW) ................................ 97151847 A

(51) Int. Cl.
*H02M 3/158* (2006.01)
(52) U.S. Cl. ............... 363/65; 363/71; 307/82; 323/272
(58) Field of Classification Search .................. 323/211, 323/222, 224, 266, 267, 271, 272, 282–285, 323/290; 363/26, 71, 65, 69, 95, 97; 307/18, 307/39, 43, 52, 53, 71, 82
See application file for complete search history.

(56) References Cited

U.S. PATENT DOCUMENTS

| | | | |
|---|---|---|---|
| 4,766,364 A * | 8/1988 | Biamonte et al. | 323/272 |
| 4,924,170 A * | 5/1990 | Henze | 323/272 |
| 5,245,525 A * | 9/1993 | Galloway et al. | 363/71 |
| 6,121,693 A * | 9/2000 | Rock | 307/18 |
| 6,424,131 B1 | 7/2002 | Yamamoto et al. | |
| 6,768,658 B2 * | 7/2004 | Perry | 363/65 |
| 7,236,381 B2 | 6/2007 | Ohno et al. | |
| 7,282,899 B1 | 10/2007 | Daun-Lindberg et al. | |
| 7,285,921 B2 | 10/2007 | Chen | |
| 7,492,059 B2 * | 2/2009 | Peker et al. | 307/71 |
| 7,675,275 B2 * | 3/2010 | Ruobiao et al. | 323/271 |

FOREIGN PATENT DOCUMENTS

CN  2750544 Y  1/2006

OTHER PUBLICATIONS

"First Office Action of China Counterpart Application", issued on May 12, 2011, p. 1-p. 6.

* cited by examiner

*Primary Examiner* — Rajnikant Patel
(74) *Attorney, Agent, or Firm* — Jianq Chyun IP Office

(57) ABSTRACT

A current regulator includes a first switch, a second switch, a first current detecting circuit, a second current detecting circuit and a control circuit. Both of the first and second current detecting circuits detect the current of corresponding power route. The control circuit controls the first and the second switches on the route to be turned on or turned off according to detecting signals, and regulates to keep the wiring current in balance.

10 Claims, 4 Drawing Sheets

CURRENT REGULATOR

CROSS-REFERENCE TO RELATED APPLICATION

This application claims the priority benefit of Taiwan application serial no. 97151847, filed on Dec. 31, 2008. The entirety of the above-mentioned patent application is hereby incorporated by reference herein and made a part of specification.

BACKGROUND OF THE INVENTION

1. Field of the Invention

The invention relates to a power supply device and, more particularly, to a current regulator with two power supplies.

2. Description of the Related Art

Generally, peripherals are powered via universal serial bus (USB) interfaces or the power over Ethernet (POE) technology.

According to the standard, the USB interface can provide the maximum power 2.5 W, and the general POE can provide the maximum power 15 W. If the wattage consumed by the product is larger than the maximum wattage provided, a "bottleneck" will appear in product design. To provide the product with larger input wattage, design engineers usually connect two USB interfaces or two POEs in parallel and reduce voltage difference between the two power supplies to avoid supplying power by a single power supply. However, the method cannot ensure the current of the two input sources in balance.

According to current limitation stipulated in the USB and POE, the USB interface can only provide a current of 0.5 A, and the POE mode of Ethernet can provide a voltage of 48V and the maximum current of 0.35 A. However, a problem will occur when load is provided for a user side by combining the two voltages. So long as one voltage is a little higher than the other one, the higher voltage will provide current for the user side. Therefore the lower voltage will not output current for the load. A general motherboard provides the maximum current of 0.5 A for the USB interface. When the current is larger than 0.5 A, a compulsive protection for the motherboard will be carried out to keep the motherboard and back end safe. Apparently, it may be limited in application when the current is not balanceable. For example, the input power supply stops providing power. Many "bottlenecks" occur because the current is not balanceable. Therefore more breakthroughs are expected, and this is just the issue that the invention overcomes.

BRIEF SUMMARY OF THE INVENTION

The invention provides a current regulator. The current regulator includes a first switch, a second switch, a first current detecting circuit, a second current detecting circuit and a control circuit. The second end of the first switch provides a power output. The second end of the second switch is coupled to the power output. The input end of the first current detecting circuit is coupled to a first power supply, and the output end is coupled to the first end of the first switch for detecting a first current and generating a first detecting signal. The input end of the second current detecting circuit is coupled to a second power supply, and the output end is coupled to the first end of the second switch for detecting a second current to generate a second detecting signal. The control circuit receives and compares the first detecting signal and the second detecting signal to control the first switch and the second switch to be turned on or turned off.

The invention also provides a current regulator. The current regulator includes a first switch, a second switch, a first current detecting circuit, a second current detecting circuit, a voltage detecting circuit and a control circuit. The second end of the first switch provides a power output. The second end of the second switch is coupled to the power output. The input end of the first current detecting circuit is coupled to a first power supply, and the output end is coupled to the first end of the first switch for detecting a first current to generate a first detecting signal. The input end of the second current detecting circuit is coupled to a second power supply, and the output end is coupled to the first end of the second switch for detecting a second current to generate a second detecting signal. The first input end of the voltage detecting circuit is coupled to the first power supply and second input end is coupled to the second power supply for detecting whether the first power supply and the second power supply provide power to generate a third detecting signal and a fourth detecting signal. The control circuit receives the first detecting signal, the second detecting signal, the third detecting signal and the fourth detecting signal to control the first switch and the second switch to be turned on or turned off hereby.

Accordingly, the current regulator of the invention can get power from the USB or POE efficiently. The current in the two groups of power wiring can be regulated when the two groups of power supplies are connected in parallel to avoid supplying power by a single power supply. When the single power supply supplies electricity, the current regulator can detect voltage to avoid switching the switches continually, and then make sure that the power can be supplied correctly. The power transmitting capability can be improved. The higher power product can be designed through the current regulator. A terminal product with a current regulator is not restricted by the USB current limitation (maximum 500 mA) or the POE current limitation (maximum 350 mA).

These and other features, aspects and advantages of the present invention will become better understood with regard to the following description, appended claims, and accompanying drawings.

DETAILED DESCRIPTION OF THE EMBODIMENTS

Figure 1:
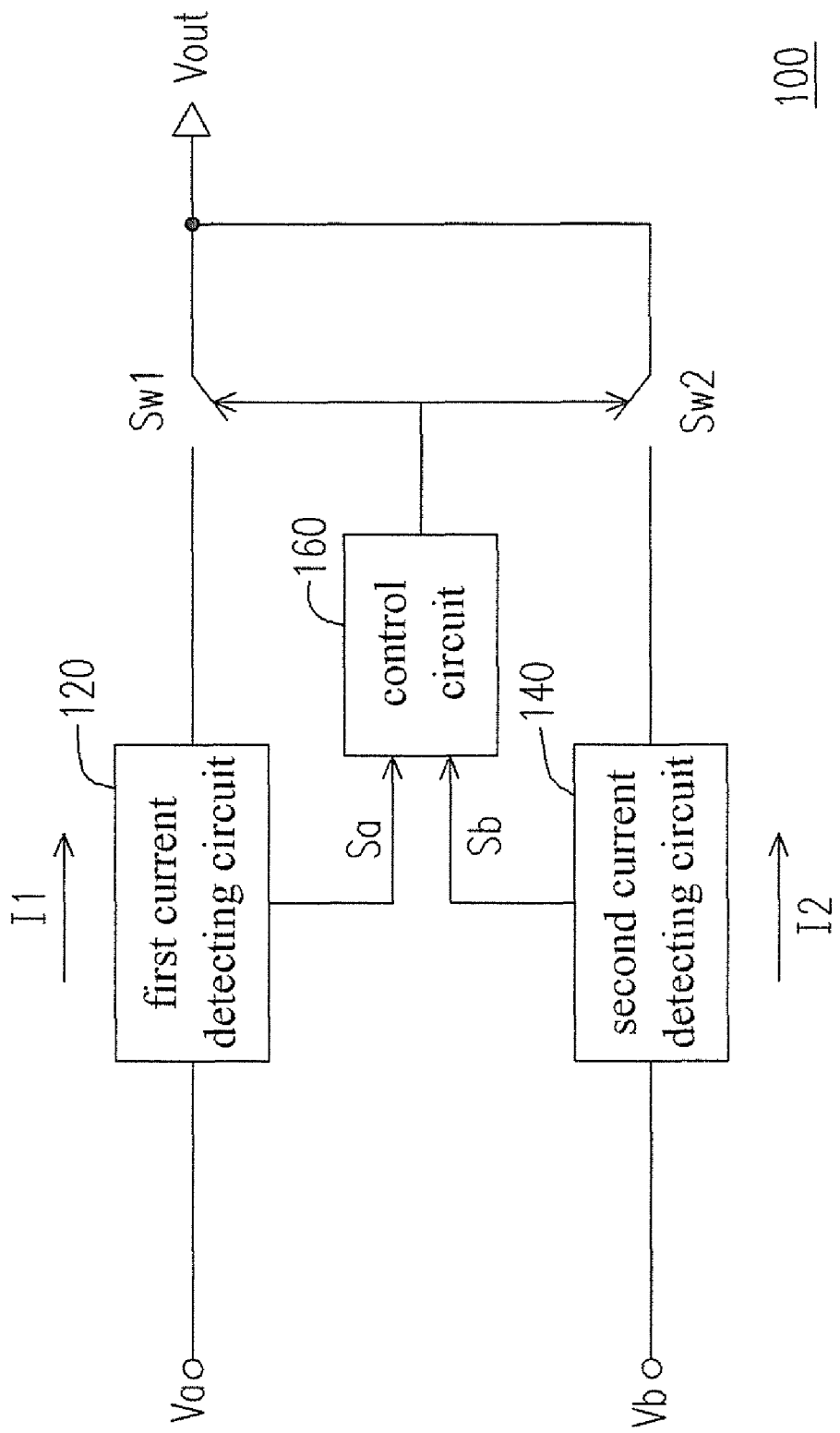
FIG. 1 is a circuit block diagram of the current regulator in an embodiment of the invention.

FIG. 1 is a circuit block diagram of the current regulator in an embodiment of the invention. The current regulator 100 includes a switch Sw1, a switch Sw2, a first current detecting circuit 120, a second current detecting circuit 140 and a control circuit 160.

The input end of the first current detecting circuit 120 is coupled to a first power supply Va, and the output end is coupled to the first end of the switch Sw1. The input end of the second current detecting circuit 140 is coupled to a second power supply Vb, and the output end is coupled to the first end of the switch Sw2. The control circuit 160 is coupled to the first current detecting circuit 120 and the second current detecting circuit 140. The second end of the switch Sw1 is coupled to the second end of the switch Sw2, and a power output Vout is provided from the junction of the two switches. The first power supply Va and the second power supply Vb can be two USB interface power supplies or two POE power supplies.

The power output Vout of the embodiment may be obtained from one of two power routes which are the first power route: first power supply Va→first current detecting circuit 120→switch Sw1→Vout, and the second power route: second power supply Vb→second current detecting circuit 140→switch Sw2→Vout. Wiring has copper loss, and different wiring have different copper losses. The first current detecting circuit 120 detects a current I1 on the first power route to generate a detecting signal Sa. The second current detecting circuit 140 detects a current I2 on the second power route to generate a detecting signal Sb. The control circuit 160 receives and compares the detecting signal Sa and detecting signal Sb to determine the current of which route is too large, and controls the switches Sw1 and Sw2 to be turned on or turned off to regulate wiring impedance and balance the current on the two power routes.

Suppose if the equivalent impedance of the first power route is Ra (not shown) and the equivalent impedance of the second power route is Rb (not shown). Therefore, Va−I1×Ra=Vb−I2×Rb=Vout. The control circuit 160 changes the equivalent impedance Ra and Rb with the power on. The equivalent impedance Ra is increased and Rb is decreased when the current I1 is detected to be larger than the I2. The equivalent impedance Ra is decreased and Rb is increased when the current I2 is detected to be larger than the I1. Thereby the current can be regulated and kept in balance.

The switches Sw1 and Sw2 can be N-Type semiconductor switches (NMOS). The work region of the NMOS switch is divided into a triode region and a saturation region. The triode region can also be called the ohmic region. When the NMOS switch works in the ohmic region, the voltage of the gate can be regulated linearly, and then the NMOS switch restrains the current by simulating the characteristic of resistors. The NMOS switch reaches different resistance at different time to regulate voltage between two ends of the switch. The output of Vout is: Va−$V_{DS-Sw1}$=Vb−$V_{DS-Sw2}$=Vout, wherein the voltage of the two ends of the switches Sw1 and Sw2 is $V_{DS-Sw1}$ and $V_{DS-Sw2}$, respectively. When the control circuit 160 turns on the switch Sw1 and turns off the switch Sw2, the power output Vout can be supplied by the first power supply Va; when the control circuit 160 turns off the switch Sw1 and turns on the switch Sw2, the power output Vout can be supplied by the second power supply Vb.

Figure 2:
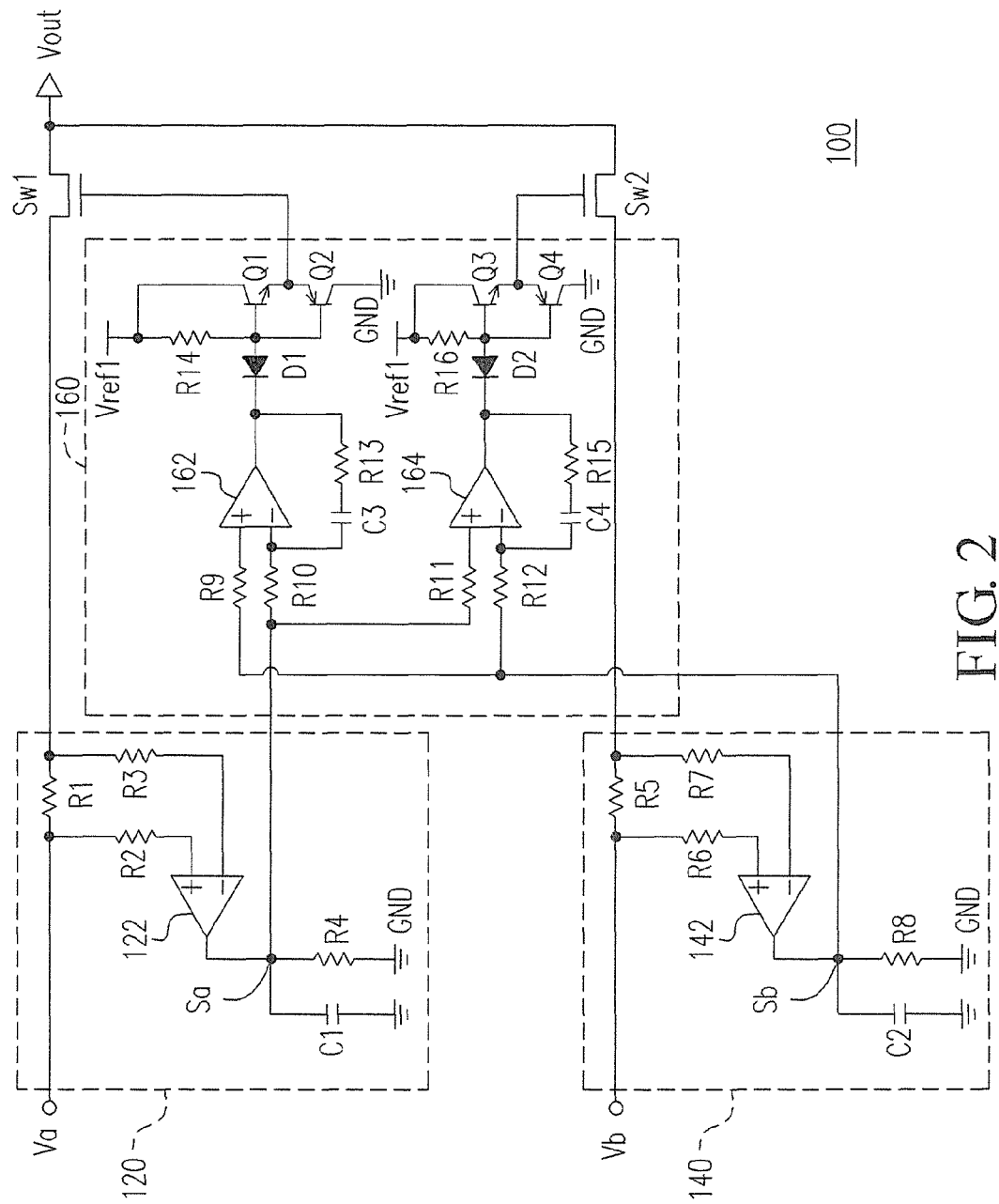
FIG. 2 is a circuit diagram of the current regulator in the embodiment of the invention in FIG. 1.

FIG. 2 is a circuit diagram of the current regulator in an embodiment of the invention in FIG. 1. As shown in FIG. 2, the first current detecting circuit 120 includes resistors R1~R4, a capacitor C1 and an operational amplifier 122. The first end of the resistor R1 is coupled to the first power supply Va. The second end of the resistor R1 is coupled to the first end of the switch Sw1. The first end of the resistor R2 is coupled to the first end of the resistor R1. The first end of the resistor R3 is coupled to the second end of the resistor R1. The first input end of the operational amplifier 122 is coupled to the second end of the resistor R2. The second input end of the operational amplifier 122 is coupled to the second end of the resistor R3. The operational amplifier 122 generates a detecting signal Sa. The resistor R4 is coupled between the output end of the operational amplifier 122 and the grounding voltage GND. The capacitor C1 is coupled between the output end of the operational amplifier 122 and the grounding voltage GND. Resistance of the resistor R2 can be equal to resistance of the resistor R3.

The second current detecting circuit 140 includes resistors R5~R8, a capacitor C2 and an operational amplifier 142. The first end of the resistor R5 is coupled to the second power supply Vb. The second end of the resistor R5 is coupled to the first end of the switch Sw2. The first end of the resistor R6 is coupled to the first end of the resistor R5. The first end of the resistor R7 is coupled to the second end of the resistor R5. The first input end of the operational amplifier 142 is coupled to the second end of the resistor R6. The second input end of the operational amplifier 142 is coupled to the second end of the resistor R7. The operational amplifier 142 generates a detecting signal Sb. The resistor R8 is coupled between the output end of the operational amplifier 142 and the grounding voltage GND. The capacitor C2 is coupled between the output end of the operational amplifier 142 and the grounding voltage GND. Resistance of the resistor R6 can be equal to resistance of the resistor R7.

The resistors R1 and R5 may be precision resistors. The magnitude of the current can be detected by the first current detecting circuit 120 and the second current detecting circuit 140, and the detecting signals Sa and Sb corresponding to load current can be generated via a designed gain. Furthermore, capacitance design for the capacitors C1 and C2 can influence switching speed. When the capacitance of the capacitors C1 and C2 is smaller, the switching speed can be accelerated and the ripple of the power output Vout can be smaller, but the tolerances for Va and Vb are poor. When the capacitance of the capacitors C1 and C2 is larger, the switching speed is slower, and the advantage is that the tolerances for Va and Vb are good, but the disadvantage is that the ripple of the power output Vout can be larger.

The control circuit 160 includes resistors R9~R16, capacitors C3~C4, diodes D1~D2, a NPN transistor Q1, a PNP transistor Q2, a NPN transistor Q3 and a PNP transistor Q4. The first end of the resistor R9 is coupled to the detecting signal Sb. The first end of the resistor R10 is coupled to the detecting signal Sa. The first input end of the operational amplifier 162 is coupled to the second end of the resistor R9. The second input end of the operational amplifier 162 is coupled to the second end of the resistor R10. The first end of the resistor R11 is coupled to the detecting signal Sa. The first end of the resistor R12 is coupled to the detecting signal Sb. The first input end of the operational amplifier 164 is coupled to the second end of the resistor R11. The second input end of the operational amplifier 164 is coupled to the second end of the resistor R12. The first end of the capacitor C3 is coupled to second input end of the operational amplifier 162. The resistor R13 is coupled between the second end of the capacitor C3 and the output end of the operational amplifier 162.

In the current regulator 100, the switches Sw1 and Sw2 can be designed to work in the triode region (ohmic region) to change the resistance between the drain-source ends timely. In the embodiment, the driving capabilities of the operational amplifiers 162 and 164 are considered, and the transistors Q1, Q2, Q3 and Q4 can be disposed in the totem pole mode to push the switches Sw1 and Sw2. The cathode of the diode D1 is coupled to the output end of the operational amplifier 162. The resistor R14 is coupled between the reference voltage Vref1 and the anode of the diode D1. The collector of the NPN transistor Q1 is coupled to the reference voltage Vref1. The base of the NPN transistor Q1 is coupled to the anode of the diode D1. The emitter of the PNP transistor Q2 is coupled to the emitter of the NPN transistor Q1 and the control end of the switch Sw1. The base of the PNP transistor Q2 is coupled to the anode of the diode D1, and the collector of the PNP transistor Q2 is coupled to the grounding voltage GND. The first end of the capacitor C4 is coupled to the second input end of the operational amplifier 164. The resistor R15 is coupled between the second end of the capacitor C4 and the output end of the operational amplifier 164. The cathode of the diode D2 is coupled to the output end of the operational amplifier 164. The resistor R16 is coupled between the reference voltage Vref1 and the anode of the diode D2. The collector of the NPN transistor Q3 is coupled to the reference voltage Vref1. The base of the NPN transistor Q3 is coupled to the anode of the diode D2. The emitter of the PNP transistor Q4 is coupled to the emitter of the NPN transistor Q3 and the control end of the switch Sw2. The base of the PNP transistor Q4 is coupled to the anode of the diode D2. The collector of the PNP transistor Q4 is coupled to the grounding voltage GND. Resistance of the resistor R9 may be equal to resistance of anyone of the resistors R10~R12.

In the embodiment, the same current detecting mechanism is applied to the two groups of the power supplies. The reacted detecting signal is transmitted to the second input end of the corresponding operational amplifier and the first input end of another operational amplifier. The equivalent impedance value of the switch of the power supply with excessive current is increased by the transition of the operational amplifier, and the equivalent impedance value of another switch is reduced. Therefore, the wiring impedance of the power with larger current can be increased, and the wiring impedance of the power with smaller current can be decreased.

Figure 3:
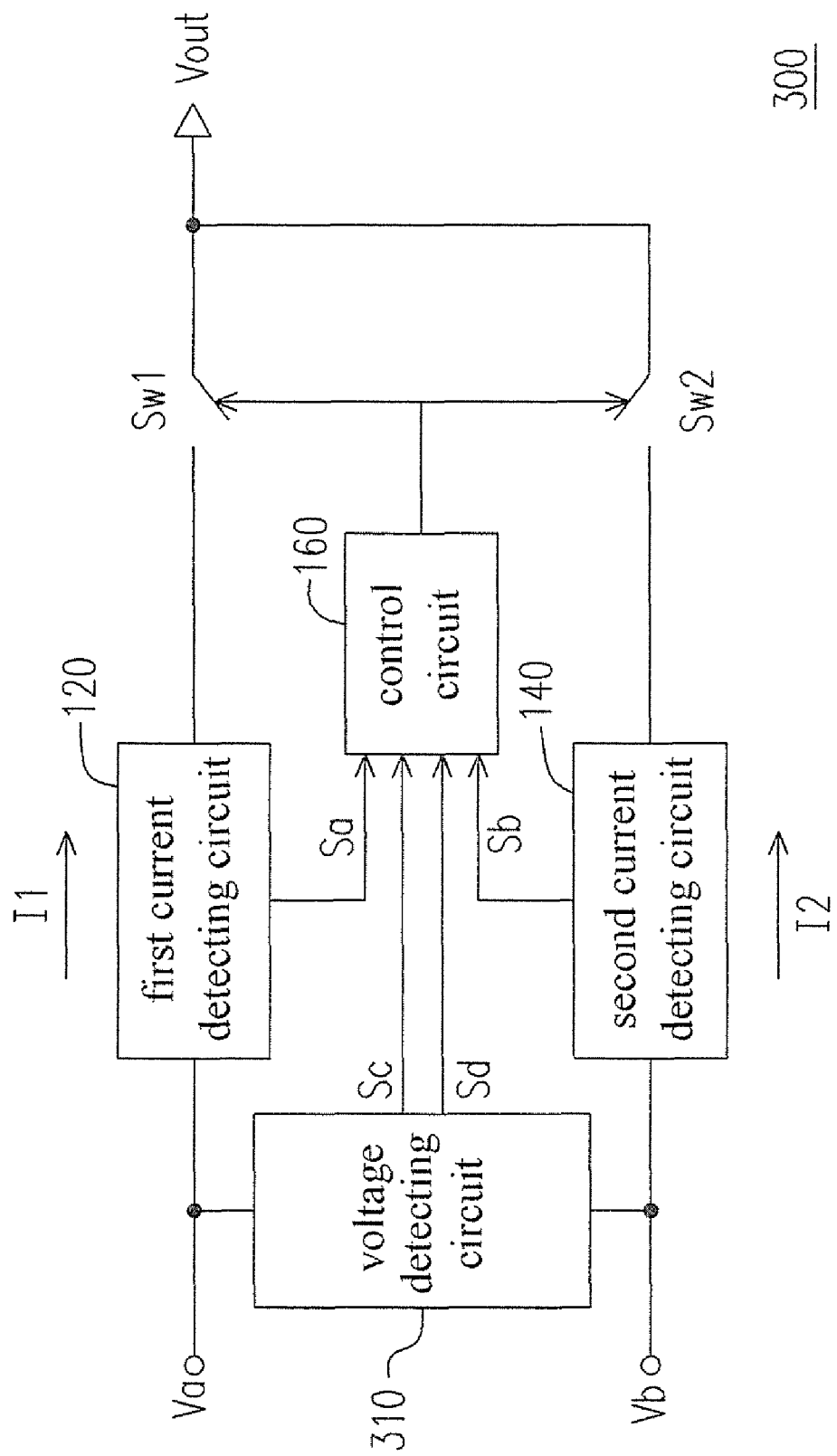
FIG. 3 is a circuit diagram of the current regulator in another embodiment of the invention.

FIG. 3 is a circuit diagram of the current regulator in another embodiment of the invention. As shown in FIG. 3, the current regulator 300 includes a switch Sw1, a switch Sw2, a first current detecting circuit 120, a second current detecting circuit 140, a control circuit 160 and a voltage detecting circuit 310. The first input end of the voltage detecting circuit 310 is coupled to the first power supply Va, and the second input end is coupled to the second power supply Vb for detecting whether the first power supply Va and the second power supply Vb supply power to generate the detecting signal Sc and Sd. The control circuit 160 receives the detecting signals Sa, Sb, Sc and Sd and controls the switch Sw1 and the switch Sw2 to be turned on or turned off based on the detecting signals Sa, Sb, Sc and Sd.

When two power supplies are provided, one of the first power supply Va and the second power supply Vb can be higher, the other one can be lower. In the embodiment, the worst situation is taken into account that only single power supply supplies power. A protection mechanism for the possible malfunction is provided in the embodiment, therefore the voltage detection is prior to the current detection.

The control circuit 160 controls the current of the power output Vout in balance according to the detecting signal Sa and Sb directly only when both of the first power supply Va and the second power supply Vb supply power. When only a single power supply supplies power, the switch Sw1 and switch Sw2 are controlled to be turned on or turned off according to the detecting signals Sc and Sd directly. For example, when the first power supply Va supplies power but the second power supply Vb doesn't, the switch Sw1 is turned on to provide the power output Vout. The first power route is turned on: first power supply Va→first current detecting circuit 120→switch Sw1→Vout. When the first power supply Va does not supply power but the second power supply Vb does, the switch Sw2 is turned on to provide the power output Vout. The second power route is turned on: second power supply Vb→second current detecting circuit 140→switch Sw2→Vout.

Figure 4:
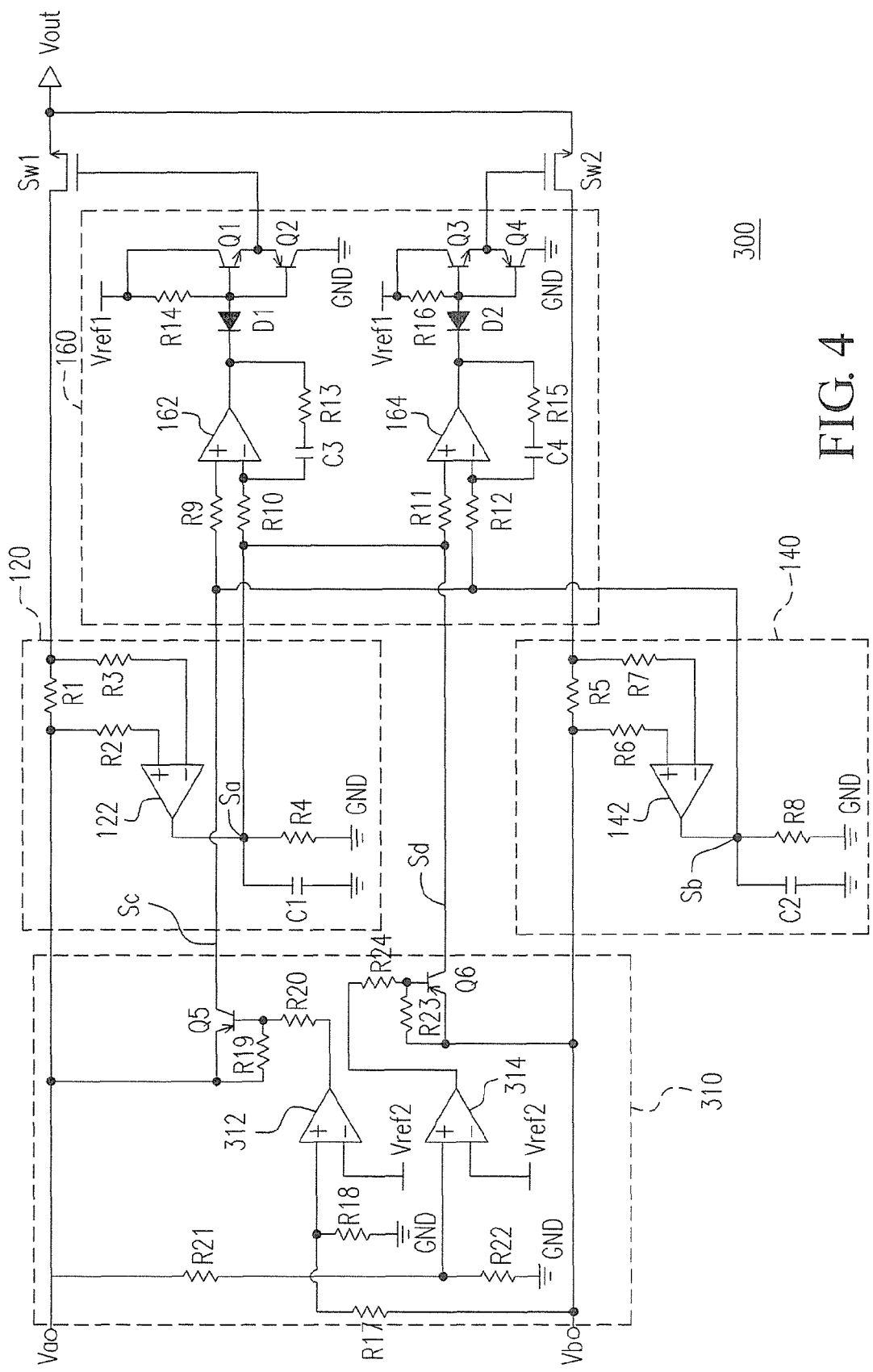
FIG. 4 is a circuit diagram of the current regulator in the embodiment of the invention in FIG. 3.

FIG. 4 is a circuit diagram of the current regulator in another embodiment of the invention in FIG. 3. A detailed voltage detecting circuit 310 includes resistors R17~R24, an operational amplifier 312, an operational amplifier 314, a PNP transistor Q5 and a PNP transistor Q6. The first end of the resistor R17 is coupled to the second power supply Vb. The resistor R18 is coupled between the second end of the resistor R17 and the grounding voltage GND. The first input end of the operational amplifier 312 is coupled to the second end of the resistor R17. The second input end of the operational amplifier 312 is coupled to the reference voltage Vref2. The reference voltage Vref2 is used to determine whether the power supply supplies power. The emitter of the PNP transistor Q5 is coupled to the first power supply Va. The resistor R19 is coupled between the base and the emitter of the PNP transistor Q5. The resistor R20 is coupled between the output end of the operational amplifier 312 and the base of the PNP transistor Q5. The first end of the resistor R21 is coupled to the first power supply Va. The resistor R22 is coupled between the second end of the resistor R21 and the grounding voltage GND. The first input end of the operational amplifier 314 is coupled to the second end of the resistor R21, and the second input end of the operational amplifier 314 is coupled to the reference voltage Vref2. The emitter of the PNP transistor Q6 is coupled to the second power supply Vb. The resistor R23 is coupled between the base and the emitter of the PNP transistor Q6. The resistor R24 is coupled between the output end of the operational amplifier 314 and the base of the PNP transistor Q6. The collector of the PNP transistor Q5 generates the detecting signal Sc, and the collector of the PNP transistor Q6 generates the detecting signal Sd.

When the second power supply Vb supplies power, the voltage of the first input end of the operational amplifier 312 is higher than the voltage of the reference voltage Vref2 through the resistor R17 and the R18 sharing the voltage to make the operational amplifier 312 output a logic high level. Then the PNP transistor Q5 is turned off to form floating. In a similar way, when the first power supply Va supplies power, the PNP transistor Q6 is turned off. The purpose of the PNP transistor Q5 and the PNP transistor Q6 floating is to give the control priority to the current detecting circuit.

The control circuit 160 is coupled to the collector of the PNP transistor Q5 via the resistor R9, and is coupled to the collector of the PNP transistor Q6 via the resistor R11. When only the first power supply Va supplies power, the PNP transistor Q6 is turned off, and then the switch Sw2 is turned off to only conduct the first power route. When only the second power supply Vb supplies power, the PNP transistor Q5 is turned off, and then the switch Sw1 is turned off to only turn on the second power route. That is, when there is only one power supply, the current detection is disabled. Therefore, according to the detecting signal Sc and Sd from the PNP transistor Q5 and Q6, the control circuit 160 can determine whether to control the switches Sw1 and Sw2 to be turned on or turned off directly according to the detecting signal Sa and Sb.

The embodiment can be used to supply power via one power supply or two power supplies, so the action of insertion or extraction with the power on can be achieved to satisfy reliability of the application requirement.

Above all, the embodiment of the invention balances the current of the two groups of wiring by detecting the current of the two power routes and controlling the two power routes to be turned on or turned off. The current regulator which can regulate the current of the power wiring according to the input of the power includes at least the following advantages.

First, the power can be acquired from the USB or POE efficiently.

Second, when two groups of power supplies are connected in parallel, the current of the two groups of the power wiring supplies can be regulated to avoid supplying the power by a single power supply.

Third, when the single power supply supplies electricity, the current regulator can detect voltage to avoid switching the switches continually, and then make sure that the power can be supplied correctly.

Fourth, the power transmitting capability can be improved.

Fifth, the product with higher power can be designed through the current regulator.

Sixth, a terminal product with a current regulator is not restricted by the USB current limitation (maximum 500 mA) or the POE current limitation (maximum 350 mA).

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A current regulator, comprising:
    a first switch whose second end provides a power output;
    a second switch whose second end is coupled to the power output;
    a first current detecting circuit, whose input end is coupled to a first power supply and output end is coupled to a first end of the first switch, for detecting a first current and generating a first detecting signal;
    a second current detecting circuit, whose input end is coupled to a second power supply and output end is coupled to a first end of the second switch, for detecting a second current and generating a second detecting signal; and
    a control circuit for receiving and comparing the first detecting signal and the second detecting signal to control the first switch and the second switch to be turned on or turned off.

2. The current regulator according to claim 1, wherein the first current detecting circuit comprises:
    a first resistor whose first end is coupled to the first power supply and second end is coupled to the first end of the first switch;
    a second resistor whose first end is coupled to the first end of the first resistor;
    a third resistor whose first end is coupled to the second end of the first resistor;
    a first operational amplifier, whose first input end is coupled to a second end of the second resistor and second input end is coupled to a second end of the third resistor, for generating the first detecting signal;
    a fourth resistor coupled between an output end of the first operational amplifier and a grounding voltage; and
    a first capacitor coupled between the output end of the first operational amplifier and the grounding voltage.

3. The current regulator according to claim 1, wherein the second current detecting circuit comprises:
    a fifth resistor whose first end is coupled to the second power supply and second end is coupled to the first end of the second switch;
    a sixth resistor whose first end is coupled to the first end of the fifth resistor;
    a seventh resistor whose first end is coupled to the second end of the fifth resistor;
    a second operational amplifier, whose first input end is coupled to a second end of the sixth resistor and second input end is coupled to a second end of the seventh resistor, for generating the second detecting signal;
    a eighth resistor coupled between an output end of the second operational amplifier and a grounding voltage; and
    a second capacitor coupled between the output end of the second operational amplifier and the grounding voltage.

4. The current regulator according to claim 1, wherein the control circuit comprises:
    a ninth resistor whose first end is coupled to the second detecting signal;
    a tenth resistor whose first end is coupled to the first detecting signal;
    a third operational amplifier whose first input end is coupled to a second end of the ninth resistor and second input end is coupled to a second end of the tenth resistor;
    a eleventh resistor whose first end is coupled to the first detecting signal;
    a twelfth resistor whose first end is coupled to the second detecting signal;
    a fourth operational amplifier whose first input end is coupled to a second end of the eleventh resistor and second input end is coupled to a second end of the twelfth resistor;
    a third capacitor whose first end is coupled to the second input end of the third operational amplifier;
    a thirteenth resistor coupled between a second end of the third capacitor and an output end of the third operational amplifier;
    a first diode whose cathode is coupled to the output end of the third operational amplifier;
    a fourteenth resistor coupled between a first reference voltage and an anode of the first diode;
    a first NPN transistor whose collector is coupled to the first reference voltage and base is coupled to the anode of the first diode;
    a first PNP transistor whose emitter is coupled to an emitter of the first NPN transistor and a control end of the first switch, whose base is coupled to the anode of the first diode, and whose collector is coupled to a grounding voltage;
    a fourth capacitor whose first end is coupled to the second input end of the fourth operational amplifier;
    a fifteenth resistor coupled between a second end of the fourth capacitor and an output end of the fourth operational amplifier;
    a second diode whose cathode is coupled to the output end of the fourth operational amplifier;
    a sixteenth resistor coupled between the first reference voltage and an anode of the second diode;
    a second NPN transistor whose collector is coupled to the first reference voltage and base is coupled to the anode of the second diode; and
    a second PNP transistor whose emitter is coupled to an emitter of the second NPN transistor and a control end of the second switch, whose base is coupled to the anode of the second diode, and whose collector is coupled to the grounding voltage.

5. The current regulator according to claim 1, wherein the first switch and the second switch are N-Type semiconductor switches.

6. A current regulator, comprising:
    a first switch whose second end provides a power output;
    a second switch whose second end is coupled to the power output;

a first current detecting circuit, whose input end is coupled to a first power supply and output end is coupled to a first end of the first switch, for detecting a first current and generating a first detecting signal;

a second current detecting circuit, whose input end is coupled to a second power supply and output end is coupled to a first end of the second switch, for detecting a second current and generating a second detecting signal;

a voltage detecting circuit, whose first input end is coupled to the first power supply and second input end is coupled to the second power supply, for detecting whether the first power supply and the second power supply provide power to generate a third detecting signal and a fourth detecting signal; and a control circuit receiving the first detecting signal, the second detecting signal, the third detecting signal and the fourth detecting signal to control the first switch and the second switch to be turned on or turned off according to the first detecting signal, the second detecting signal, the third detecting signal and the fourth detecting signal.

7. The current regulator according to claim 6, wherein when the voltage detecting circuit detects that both of the first power supply and the second power supply provide power, the control circuit controls the first switch and the second switch according to the first detecting signal and the second detecting signal; when the voltage detecting circuit detects only one of the first power supply and the second power supply provides power, the control circuit controls the first switch and the second switch according to the third detecting signal and the fourth detecting signal.

8. The current regulator according to claim 7, wherein the first switch is turned on when only the first power supply provides power, and the second switch is turned on when only the second power supply provides power.

9. The current regulator according to claim 6, wherein the voltage detecting circuit comprises:

a seventeenth resistor whose first end is coupled to the second power supply;

a eighteenth resistor coupled between a second end of the seventeenth resistor and a grounding voltage;

a fifth operational amplifier whose first input end is coupled to the second end of the seventeenth resistor and second input end is coupled to a second reference voltage;

a third PNP transistor whose emitter is coupled to the first power supply, wherein a nineteenth resistor is coupled between the emitter and base of the third PNP transistor;

a twentieth resistor coupled between an output end of the fifth operational amplifier and the base of the third PNP transistor;

a twenty-first resistor whose first end is coupled to the first power supply;

a twenty-second resistor coupled between a second end of the twenty-first resistor and the grounding voltage;

a sixth operational amplifier whose first input end is coupled to the second end of the twenty-first resistor and second input end is coupled to the second reference voltage;

a fourth PNP transistor whose emitter is coupled to the second power supply, wherein a twenty-third resistor is coupled between the emitter and base of the fourth PNP transistor; and a twenty-fourth resistor coupled between an output end of the sixth operational amplifier and the base of the fourth PNP transistor;

wherein a collector of the third PNP transistor generates the third detecting signal and a collector of the fourth PNP transistor generates the fourth detecting signal.

10. The current regulator according to claim 9, wherein the control circuit is coupled to the collector of the third PNP transistor and the collector of the fourth PNP transistor, when the first power supply provides power, the fourth PNP transistor is turned off, and when the second power supply provides power, the third PNP transistor is turned off.

* * * * *